(12) United States Patent
Kweon et al.

(10) Patent No.: US 9,454,795 B2
(45) Date of Patent: Sep. 27, 2016

(54) IMAGE OPTIMIZED ROLLING CACHE SYSTEM

(71) Applicant: KOREA ADVANCED INSTITUTE OF SCIENCE AND TECHNOLOGY, Daejeon (KR)

(72) Inventors: In-So Kweon, Daejeon (KR); Young-Geun Kim, Suwon-si (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 162 days.

(21) Appl. No.: 14/469,839

(22) Filed: Aug. 27, 2014

(65) Prior Publication Data

US 2015/0077426 A1    Mar. 19, 2015

(30) Foreign Application Priority Data

Aug. 29, 2013 (KR) ........................ 10-2013-0103053

(51) Int. Cl.
G09G 5/36 (2006.01)
G06T 1/60 (2006.01)
G06F 12/08 (2016.01)

(52) U.S. Cl.
CPC ............. *G06T 1/60* (2013.01); *G06F 12/0886* (2013.01); *G06F 2212/455* (2013.01)

(58) Field of Classification Search
None
See application file for complete search history.

(56) References Cited

U.S. PATENT DOCUMENTS 9,122,609 B2 * 9/2015 Budagavi ............ G06F 12/0844

FOREIGN PATENT DOCUMENTS

| KR | 10-0737741 | 7/2007 |
|----|------------|--------|
| KR | 10-0806345 | 2/2008 |
| KR | 10-2010-0069240 | 6/2010 |

* cited by examiner

*Primary Examiner* — Jacinta M Crawford
(74) *Attorney, Agent, or Firm* — Lex IP Meister, PLLC

(57) ABSTRACT

An image optimized rolling cache system extracts pixel information and address information of a corresponding pixel from an input image to store the extracted pixel information and the extracted address information, and processes the image by applying a vertical rolling mechanism or a horizontal rolling mechanism using the stored information.

6 Claims, 13 Drawing Sheets

(a)

(b)

(a)

(b)

(c)

(a)

(b)

IMAGE OPTIMIZED ROLLING CACHE SYSTEM

CROSS-REFERENCE TO RELATED APPLICATION

This application claims priority to and the benefit of Korean Patent Application No. 10-2013-0103053 filed in the Korean Intellectual Property Office on Aug. 29, 2013, the entire contents of which are incorporated herein by reference.

BACKGROUND OF THE INVENTION (a) Field of the Invention

The present invention relates to an image optimized rolling cache system.

(b) Description of the Related Art

A filed-programmable gate array (FPGA) serves as an optimized hardware accelerator for real time image processing and a vision application. However, if image resolution is increased, there is a need to use an external SDR/DDR memory. A predetermined pixel access pattern used in most algorithms reduces a bandwidth thereof resulting from an access delay increase.

An efficient cache design is very important for a real time intensive application. An effect resulting from the cache design is changed according to a spatial area and a time area of data access. The spatial area in image processing represents horizontally and vertically two-dimensional neighbor pixels. However, in general, since a vertical area cannot be defined in an existing cache used for a processor, an efficient cache design is difficult.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an image optimized rolling cache system having advantages of optimizing an image by reducing a miss penalty.

According to the present invention, a miss penalty through the rolling cache may be reduced. Since the complexity of implementation or an access delay time is not increased, data may be rapidly processed.

Further, since there is no need for an additional procedure such as storage of a relative address or removal of existing data in a block during vertical rolling, increase in a time delay or a resource for processing the data may be prevented.

DETAILED DESCRIPTION OF THE EMBODIMENTS

Figure 1:
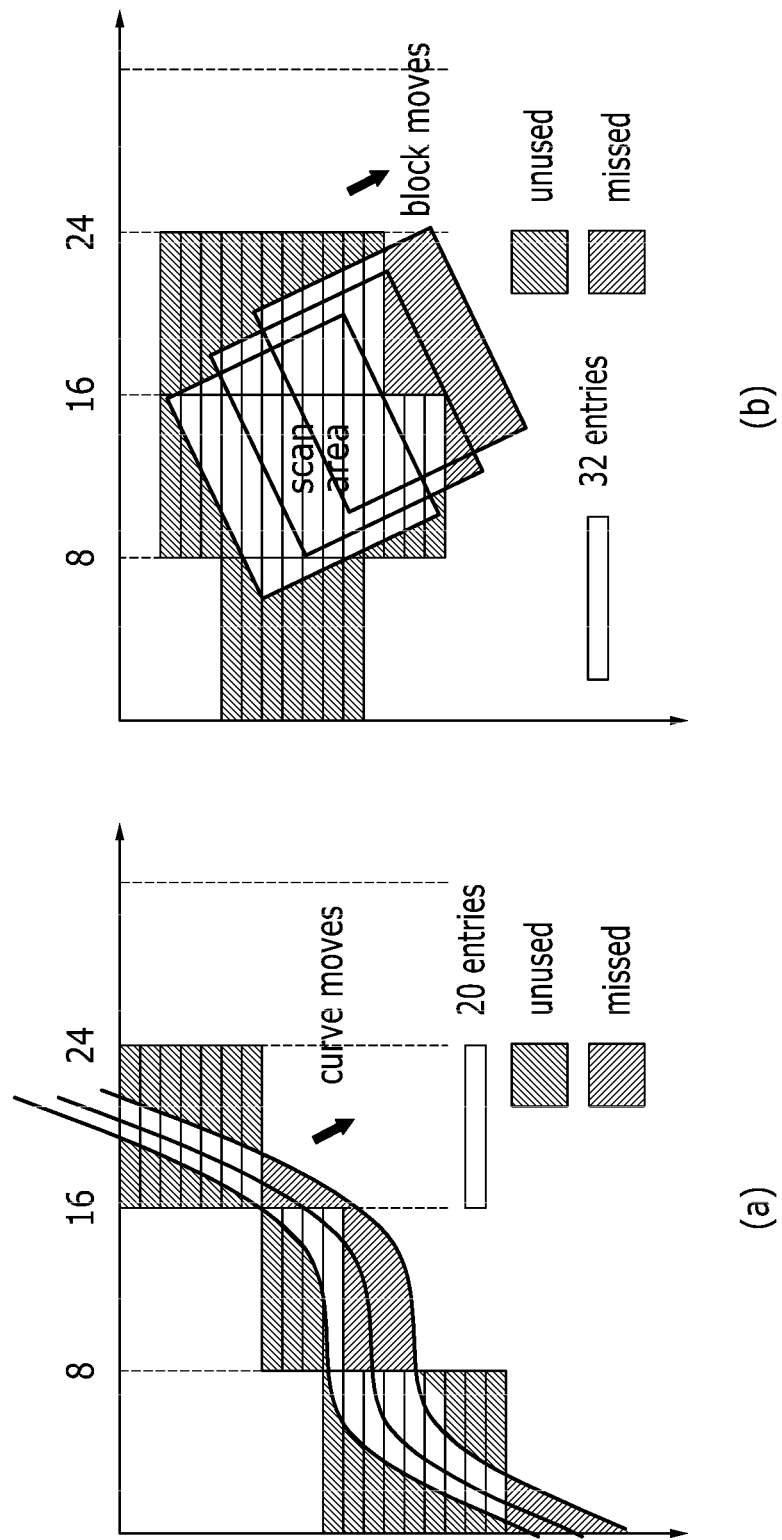
FIG. 1 is a schematic diagram illustrating an operation method of a cache with respect to a general pixel access pattern.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Through this specification, In addition, unless explicitly described to the contrary, the word "comprise" and variations such as "comprises" or "comprising" will be understood to imply the inclusion of stated elements but not the exclusion of any other elements.

A memory system design is a very important element for a real time application including memory intensive algorithms. In order to process the real time application, the memory system should be designed to process calculations as much as possible in parallel using parallelism of a given algorithm. If the cache is efficiently designed, a bandwidth and access delay of a memory may be reduced.

Basically, the cache structure should be optimized to an image structure and an algorithm in order to reduce a miss penalty, and it is recommended for reducing the access delay of the memory to use a multi-layered cache structure. Further, caches having a multiple input/output port allow parallel access of data, and multiple caches may significantly improve parallel processing performance of a system.

The efficiency of a cache memory depends on spatial and temporal locality of the data access. The temporal locality assumes that access data is reused once, and the spatial locality assumes that neighbor elements of the access data have a high access probability. The neighbor element means data having temporal and spatial adjacency.

However, the meaning of the neighbor element in general software is considerably different from that of image processing algorithms. The neighbor data in the general software signifies linearly and continuously mapped variables in one-dimensional address space. When taking the variables into consideration in an image, only horizontally mapped pixels are applied. However, since the neighbor elements in the image correspond to horizontally and vertically neighboring pixels, a concept of the neighbor element should be changed for an efficient cache design to process the image.

For example, image interpolation is a basic element of most image processing algorithms. To this end, there is a need for four pixels which are horizontally and vertically located. According to the exemplary embodiment of the present invention, the concept of locality refers to horizontal and vertical locality. Since the horizontal and vertical locality is defined only when the size of the image is determined, the vertical locality cannot be defined in a cache used for a general processor. Accordingly, there is a demand for a cache structure having another form supporting the horizontal and vertical locality.

Hereinafter, the image optimized rolling cache system and a method thereof according to the exemplary embodiment of the present invention will be described with reference to the accompanying drawings. Before describing the exemplary embodiment of the present invention, a general cache operation method will be firstly described with reference to FIG. 1.

FIG. 1 is a schematic diagram illustrating an operation method of a cache with respect to a general pixel access pattern.

FIGS. 1 (a) and (b) illustrate an operation of a general cache with respect to a pixel access pattern of a curve or block form in an image. FIG. 1 (a) illustrates an example of an operation scheme of the general cache with respect to a predetermined pixel access pattern. FIG. 1 (b) illustrates an example of an operation scheme of the general cache with respect to a predetermined pixel access pattern of the block form.

As shown in FIG. 1 (a), the pixel access pattern of the curve form is generally represented in an image processing application such as warping, morphing, image transformation, or distortion correction. Further, as shown in FIG. 1 (b), the access pattern of the block form is presented in a window based vision algorithm.

Twenty cache blocks shown in FIG. 1 (a) are located in a boundary of a cache along a curve of the uppermost end. For example, it is assumed that one cache block stores data of 8 bytes and the cache is fully associated. This means that data arranged in an 8 byte unit may be included in a certain cache block regardless of location.

As shown in FIG. 1 (a), the cache blocks include two slash areas. The slash areas represent pixels that are unused when three images of a curve form are accessed although data are firstly read from a memory. Reverse slash areas represent pixels missed when second and third curve patterns access.

If the slashed areas are larger, unused data is read, which increases unnecessary memory bandwidth. Further, larger reverse slashed area are critical to system performance because repeatedly accessing memory significantly increases the memory bandwidth and processing stall until the missed block is fetched. That is, the calculation is delayed until one block including a missed pixel is fetched from the cache. If the delay is repeated, the bandwidth of the memory is significantly increased.

A pixel access pattern of another form includes a block form as shown in FIG. 1 (b). FIG. 1 (b) illustrates that one block descends from a top end and accesses a cache block three times. For example, a total of 32 cache blocks are used. In order to cover a block area of the uppermost end, the cache block surrounds the block area. While the second and third block areas access the cache block, it will be understood that the unused or missed area is very large.

In this manner, most image processing and vision algorithms include a similar access pattern of a curve form or a block form to read a pixel. If the cache is designed to use a horizontal or vertical locality, old data are maintained without replacement of the entire block which is inevitably used in the general cache, only missed data may be updated, and the bandwidth and the calculation delay of the memory may be minimized without replacement of the entire block in which the unused data are read or missed.

Hereinafter, a cache scheme according to an exemplary embodiment of the present invention will be described. The cache scheme according to the exemplary embodiment of the present invention refers to a 'rolling cache'. Before describing the rolling cache system and a method thereof, an operation method of the rolling cache according to the exemplary embodiment of the present invention will be firstly described with reference to FIG. 2.

Figure 2:
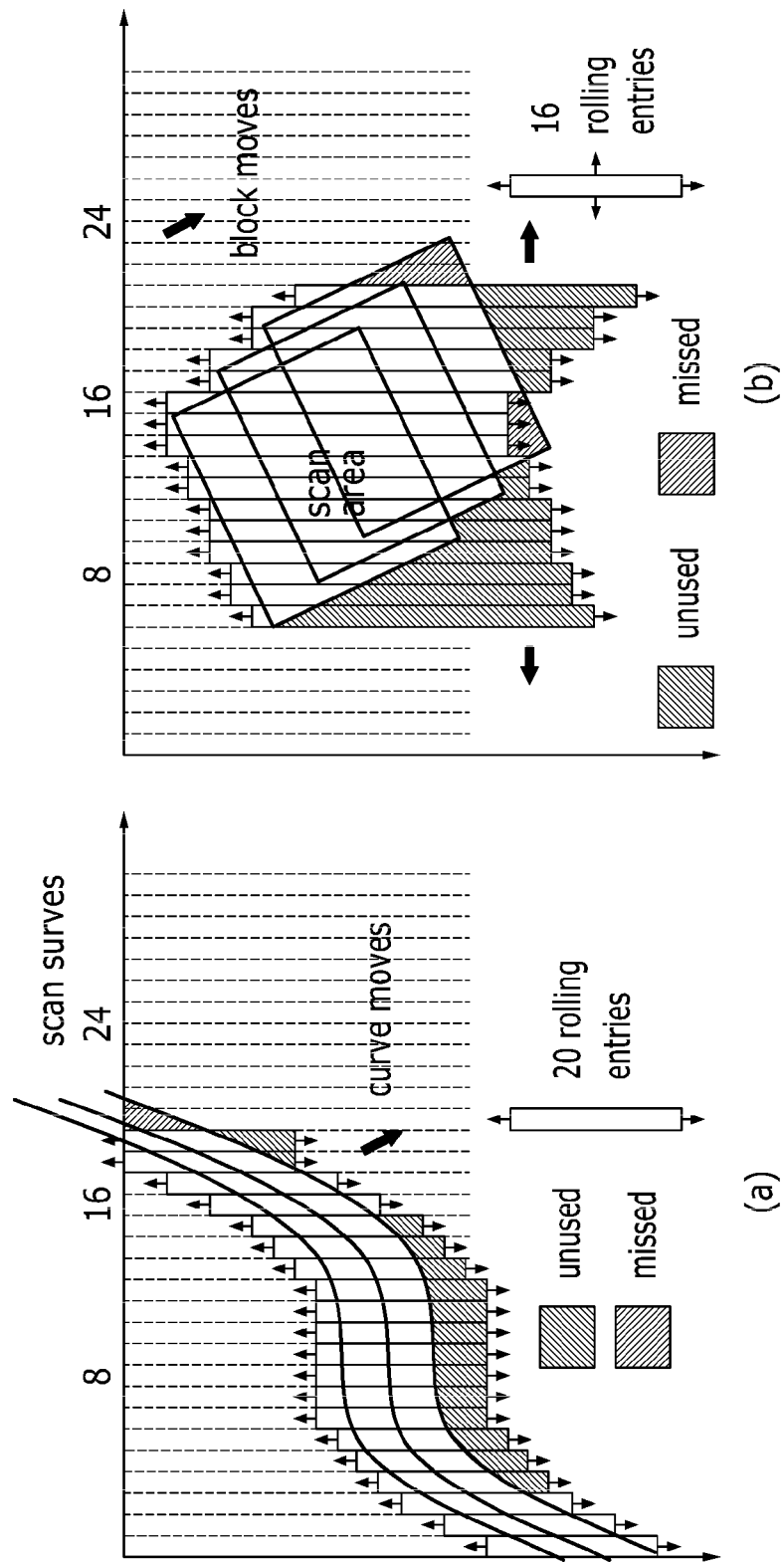
FIG. 2 is a schematic diagram illustrating an operation method of a rolling cache according to an exemplary embodiment of the present invention.

FIG. 2 shows schematic diagrams illustrating an operation method of a rolling cache according to an exemplary embodiment of the present invention.

That is, FIGS. 2 (a) and (b) illustrate a schematic diagram illustrating a concept of a cache (hereinafter referred to as a 'rolling cache') which is horizontally or vertically moved to minimize the unused area and the missed area of the pixel, and to reduce the missed penalty.

As shown in FIG. 2 (a), the number of cache blocks is configured by the same number of cache blocks as the number of those of FIG. 1 (a), but data of 8 bytes are vertically stored, rather than horizontally. In addition, when a curve of the uppermost end accesses, 20 blocks are arranged to store data of 8 bytes along the curve of the uppermost end. Until data access of all curves is terminated, initially located cache blocks cover most locations of access curves.

Assuming that each cache block may be independently and vertically moved along each column in the image, all cache blocks are moved independently downward in order to cover the curves. Further, the unused areas and the missed areas are minimized for a while. This represents a vertical rolling cache.

In FIG. 2 (b), the rolling cache has the same size as the size of the general cache as shown in FIG. 1 (b), but the block number is half of that of the general cache, and the size of each block is twice that of the general cache. After three blocks access from the top end, it will be understood that the unused area and the missed area are significantly smaller than those of the general cache as shown in FIG. 1(b).

That is, assuming that the cache may be moved rightward and leftward, and all cache blocks are vertically and horizontally moved to cover access areas. This is a rolling cache, and has a cache structure that is more suitable than a structure of the general cache for processing the image. A configuration of the rolling cache system will be descried with reference to FIG. 3.

Figure 3:
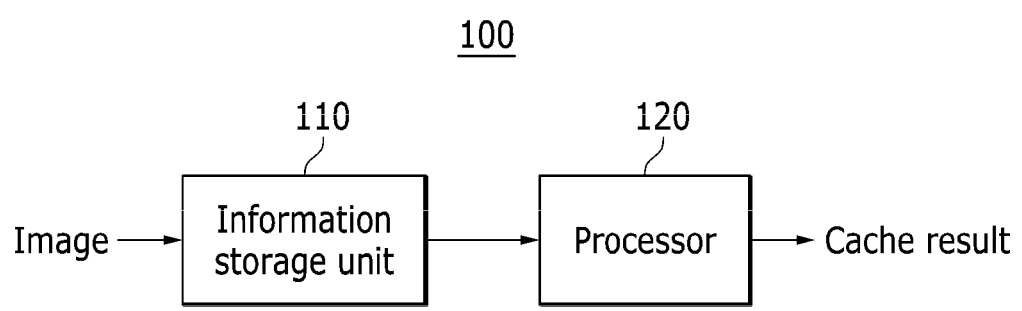
FIG. 3 is a block diagram illustrating a configuration of a rolling cache system according to an exemplary embodiment of the present invention.

FIG. 3 is a block diagram illustrating a configuration of a rolling cache system according to an exemplary embodiment of the present invention.

As shown in FIG. 3, the rolling cache system 100 includes an information storage unit 110 and a processor 120. Although not shown in FIG. 3, the rolling cache system 100 may further include constituent elements required by the general cache system.

The information storage unit 110 extracts pixel information and address information of a corresponding pixel from an externally input image. Further, the information storage unit 110 stores the extracted pixel information and the extracted address information. Since the method of extracting the pixel information and the address information from the image may be performed by various schemes, a detailed description thereof is omitted in the exemplary embodiment of the present invention.

The exemplary embodiment of the present invention is realized to use the horizontal and vertical locality for local image data by storing pixels of a block form in one cache block. Accordingly, the address information of the pixel stored by the information storage unit 110 is divided into four parts including tag information, a cache index, a line index, and a word index, which are described together with a description of the processor 120.

The processor 120 applies a rolling mechanism using the extracted information. In this case, the processor 120 determines whether a cache block of an image to be processed should be replaced to perform vertical rolling or horizontal rolling based on the determination result.

An exemplary embodiment of indexing the address information extracted from the information storage unit 110, that is, of indexing the rolling cache, will be firstly described with reference to FIG. 4 when the processor 120 applies the rolling mechanism.

Figure 4:
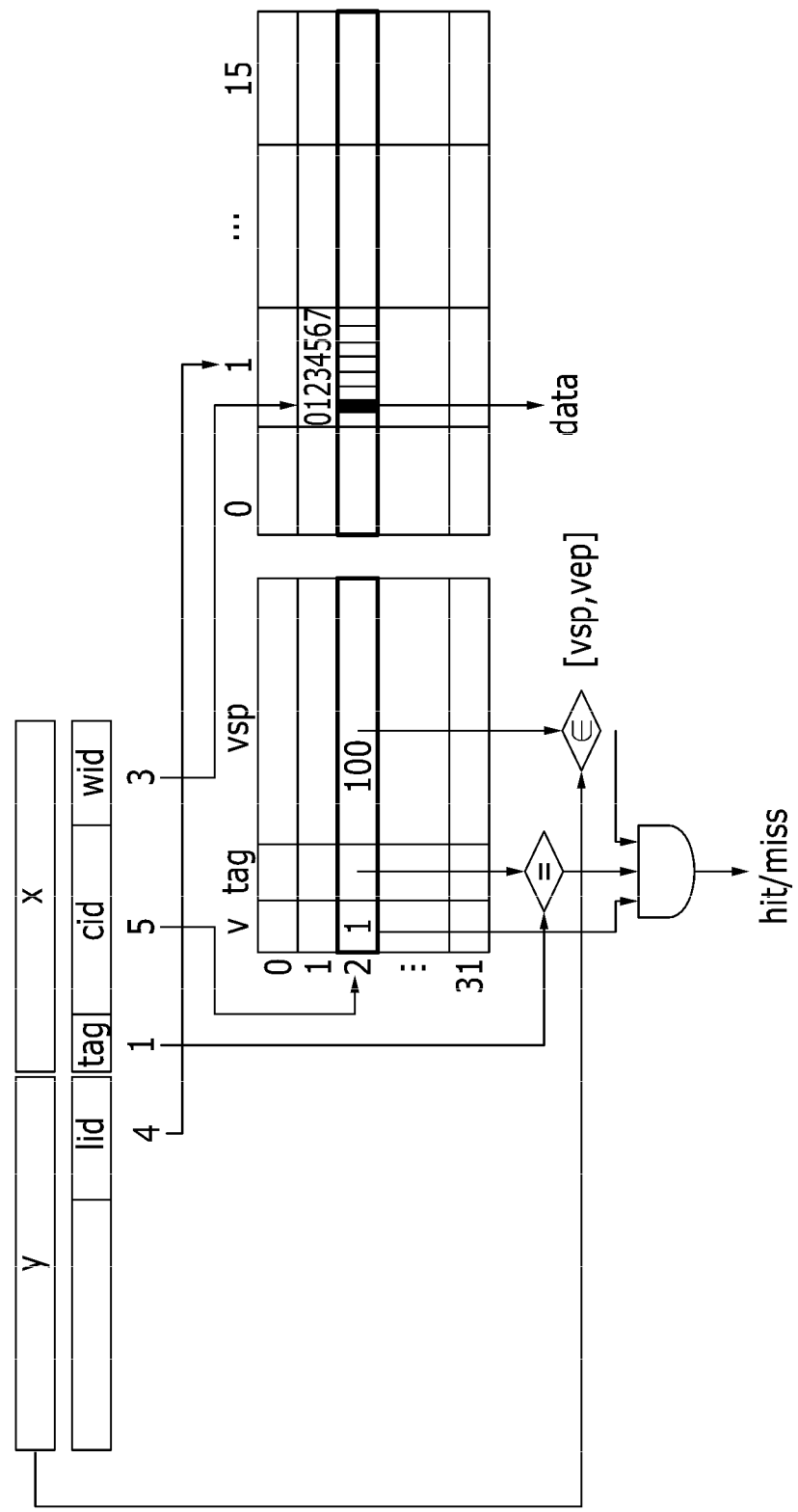
FIG. 4 is a schematic diagram illustrating rolling cache indexing according to an exemplary embodiment of the present invention.

FIG. 4 is a schematic diagram illustrating rolling cache indexing according to an exemplary embodiment of the present invention.

As shown in FIG. 4, the rolling cache indexing is divided into four parts, and a cache index cid is used to select a cache block. Further, a tag field (tag) being tag information in a horizontal coordinate x of one pixel is compared with a tag field of the cache block to detect whether data is horizontally hit or missed. In order to detect whether the data is vertically hit or missed, a vertical coordinate y of the pixel is compared with a vertical start position field vsp of a corresponding cache block.

Since the size of the cache block is fixed, there is no demand to compare the vertical coordinate y of the pixel with a vertical end position. A line index field lid being a least significant bits (LSB) of the vertical coordinate y is used to select a corresponding line in a corresponding cache line, and a word index field wid being LSBs of the horizontal coordinate x is used to select a corresponding word of the line.

The number of bits the word index wid determines into how many columns a width and an image of the cache block are divided. The bit number of the line index Lid determines a height of the cache, and the bit number of the tag field (tag) determines the column number of an image mapped to one cache block. If the tag field is absent, one image is divided into a plurality of columns and one cache block is mapped for each column, so that the image is completely spanned. This scheme is extensively used to process an image in a scan scheme.

A tag having t bits maps $2^t$ columns to one block to cover $2^t$ divided areas. This scheme may be mainly used to process the image of a block form. The mapping method may be selectively changed according to an algorithm used.

Meanwhile, the processor 120 determines whether the missed cache block is replaced and then performs one of the vertical rolling or the horizontal rolling. The vertical rolling and the horizontal rolling are described as follows.

In order to perform the vertical rolling vertically moving a column of a corresponding cache block when each cache block is missed, the processor 120 stores a vertical range [vsp,vep] of the cache block. In this case, the vsp represents a vertical start position of the cache block and the vep represents a vertical end position of the cache block. Since all cache blocks have the same height, in order to reduce the size of a tag memory, it is sufficient to store only a vertical range with respect to one of all the cache blocks.

When the cache block is missed, unlike a general cache replacing the entire block, the rolling cache may reuse existing data by updating a missed part thereof. A case of updating the missed part of the rolling cache depends on the following three cases. A first case is a case where the cache block is empty or completely missed. A second case is a case where a pixel vertical coordinate y is located higher than the vertical start position vsp of a corresponding cache block. A third case is a case where the pixel vertical coordinate y is located lower than the vertical end position vep of the corresponding cache block.

In the first case, the cache block should be read from the memory. In this case, according to the exemplary embodiment of the present invention, in order to represent the size of the cache block, the size of the cache block is defined as a vertical height CVW and a horizontal width CHW of the cache.

The following Table 1 represents a replacement scheme according to the exemplary embodiment of the present invention.

TABLE 1

| State | v = 0 or another tag | y < vsp | y ≥ vep |
|---|---|---|---|
| vsp' | min(y, $Y_{MAX}$ − CVW) | y | y − CVW − 1 |
| vep' | vsp' + CVW | y + CVW | y + 1 |
| Mvsp | vsp' | y | max(vep, vsp') |
| Mvep | vep' | min(vsp, vep') | vep' |

A vertical start position vsp' to be newly updated is determined as a minimum value of the pixel vertical coordinate y and an image lower limit $Y_{MAX}$-CVW. In this case, the $Y_{MAX}$ represents an image height, and a vertical end position vep' to be updated is calculated as vsp'+CVW.

A vertical range to be read from the memory is expressed as Mvsp and Mvep, which are equal to vsp' and vep', respectively. The processor 120 requests data of a block form using the Mvsp, the Mvep, and the CHW. When fetch is terminated, the processor 120 changes the vsp field of a corresponding cache field. The second and third cases compare the pixel vertical address y with a vertical range of a corresponding cache block to request only an area which is not overlapped.

The above has described the vertical rolling and the replacement of the missed cache. The following is a description of the horizontal rolling performed by the processor 120.

When the cache block is missed so that the processor 120 moves the rolling cache rightward and leftward, a tag field of the horizontal coordinate x may represent the same effect as that of vertical motion without additional resources. This is because one cache block may cover a plurality of image columns while being spaced apart from each other. The horizontal rolling will be firstly described with reference to FIG. 5.

Figure 5:
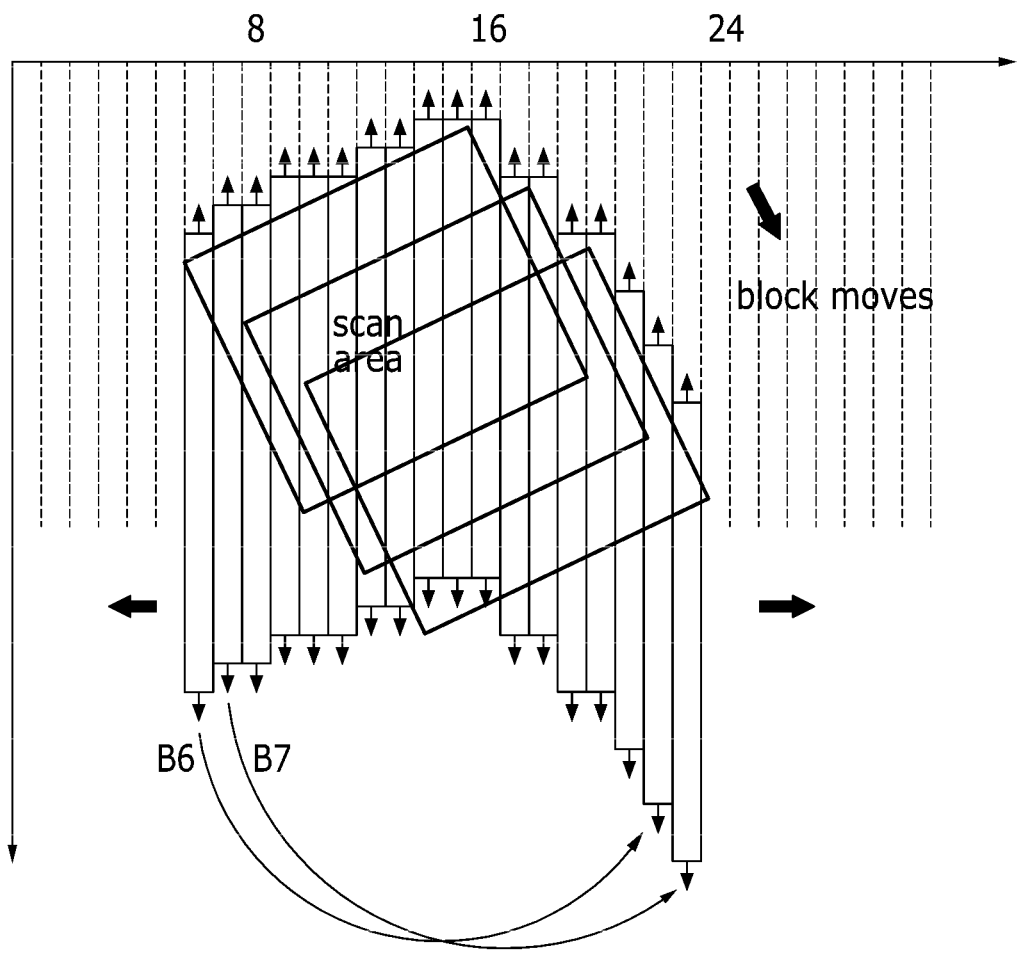
FIG. 5 is a schematic diagram illustrating horizontal rolling according to an exemplary embodiment of the present invention.

FIG. 5 is a schematic diagram illustrating horizontal rolling according to an exemplary embodiment of the present invention.

FIG. 5 shows 16 cache blocks initially including a column 6 to a column 21. Further, respective blocks may be spaced apart from each other by 16 column intervals to cover next columns.

While the processor 120 accesses the second area and then accesses the third area, if columns 22 and 23 are missed, blocks B6 and B7 located at the columns 6 and 7 are moved to cover right columns 22 and 23. This is because the cache block B6 may cover columns 6, 22, 38, and the like, and the cache block B7 may cover columns 7, 23, 39, and the like.

The cache is not substantially moved but it appears that the cache is horizontally moved. A replacement scheme with respect to the horizontal rolling corresponds to the first case described in the Table 1. Since FIG. 5 shows a concept of the horizontal rolling, a real cache does not horizontally store 1 byte, but horizontally stores at least 16 or 32 bytes.

As described above, the following is an exemplary embodiment applied to image keeping when the processor 120 applies a rolling mechanism using the extracted information from the information storage unit 110. In the exemplary embodiment of the present invention, an example of increasing interpolation performance by applying a multiple pipeline structure together with a general multi-core processor is described.

That is, the exemplary embodiment of the present invention describes the rolling cache optimized to the image using the horizontal and vertical locality which may reduce the miss penalty by horizontally and vertically moving the cache. In order to verify improvement of the performance using the rolling cache, a pipeline interpolation structure having a multi-layered structure with the rolling cache as a multiple cache structure to maximize the performance has been proposed. The image interpolation method will be described with reference to FIGS. 6 to 8, and multiple caches will be described with reference to FIG. 9.

Figure 6:
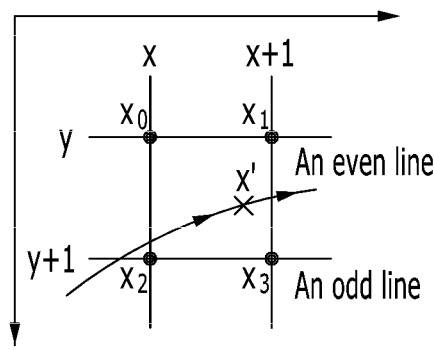
FIG. 6 is a schematic diagram illustrating an image interpolation method according to an exemplary embodiment of the present invention.
Figure 6:
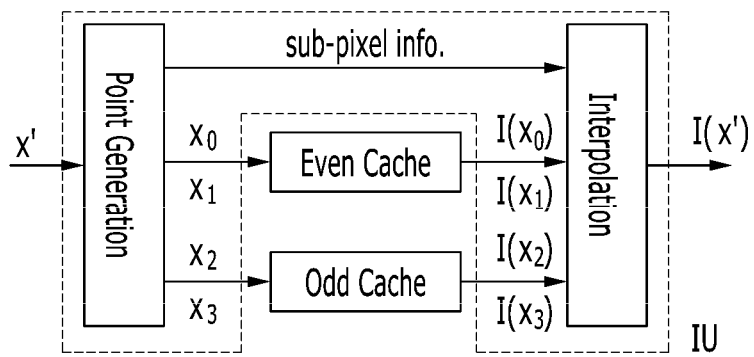
Figure 6:
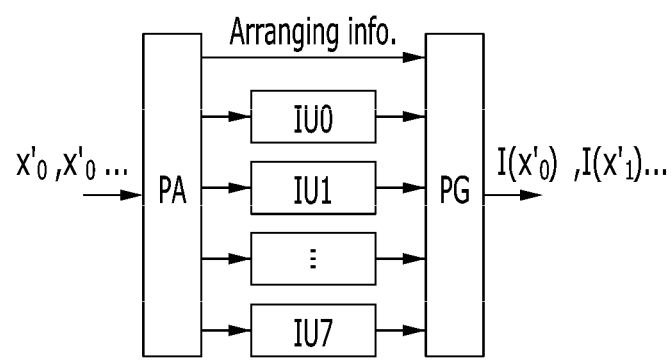

FIG. 6 is a schematic diagram illustrating an image interpolation method according to an exemplary embodiment of the present invention.

Image interpolation is a basic calculation element of image processing and vision algorithms operating at a sub-pixel position. The image interpolation includes nearest interpolation, bilinear interpolation, and bicubic interpolation. The exemplary embodiment of the present invention describes an example of applying a rolling mechanism to the bilinear interpolation.

As shown in FIG. 6 (a), bilinear image interpolation has a relative average value according to distances of neighbor pixels $x_0$, $x_1$, $x_2$, and $x_3$ surrounding a sub-pixel position x'. The rolling cache should simultaneously provide four pixels for image interpolation without pipeline delay.

To this end, in the exemplary embodiment of the present invention, a separate cache is applied to an even-numbered row and an odd-numbered row, and at least two pixel data are stored in one cache word. Accordingly, four pixels are simultaneously accessed in parallel.

FIG. 6 (b) is a schematic diagram illustrating an interpolation unit. The interpolation unit generates four coordinates closest to the sub-pixel coordinate x', and sends the four generated coordinates to a corresponding cache in parallel so that the corresponding cache obtains data to perform interpolation.

FIG. 6 (c) illustrates 8 pipeline units which are operated in parallel. A pixel allocation unit PA allocates a maximum of 8 sub-pixels to interpolation units which are not operated, and a pixel acquisition unit PG receives allocation information of sub-pixels allocated to the interpolation unit to sum up the interpolation results.

In this manner, the rolling cache simultaneously provides 32 pixels for 8 bilinear interpolations without pipeline delay. However, in order to perform this, since many input and output ports should be implemented, the exemplary embodiment of the present invention uses a cache having a multi-layered structure using an L1 cache having a small size and an L2 cache having a large size. This will be described with reference to FIGS. 7 and 8.

Figure 7:
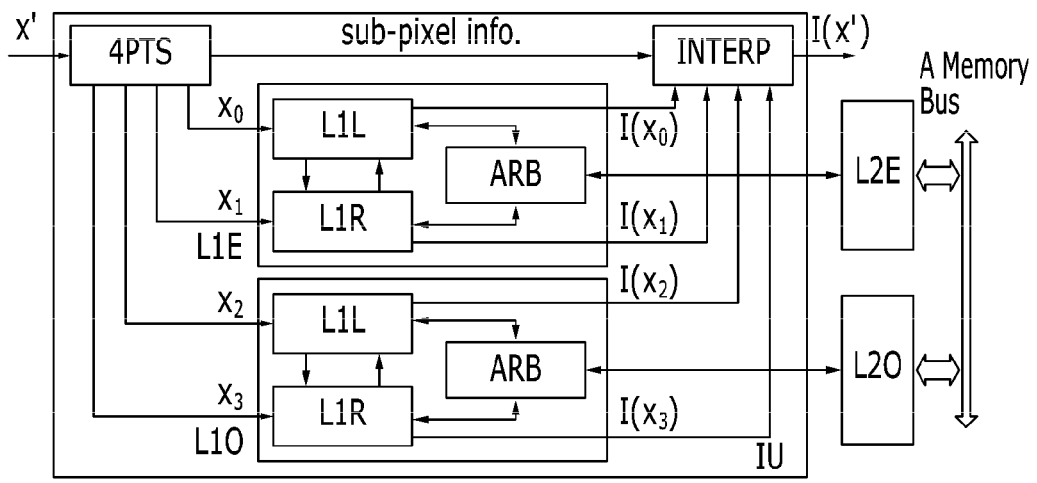
FIG. 7 is a schematic diagram illustrating an L1 cache having a multi-layered structure according to an exemplary embodiment of the present invention.
Figure 7:
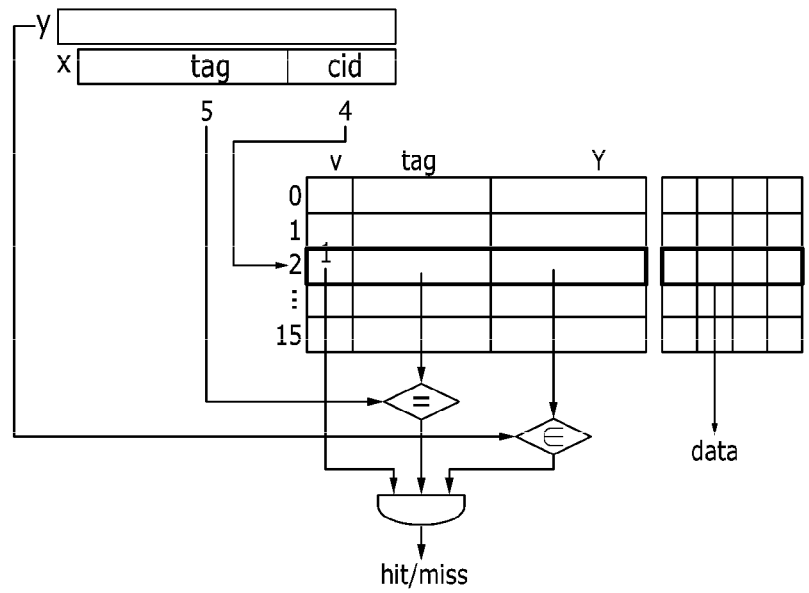
Figure 8:
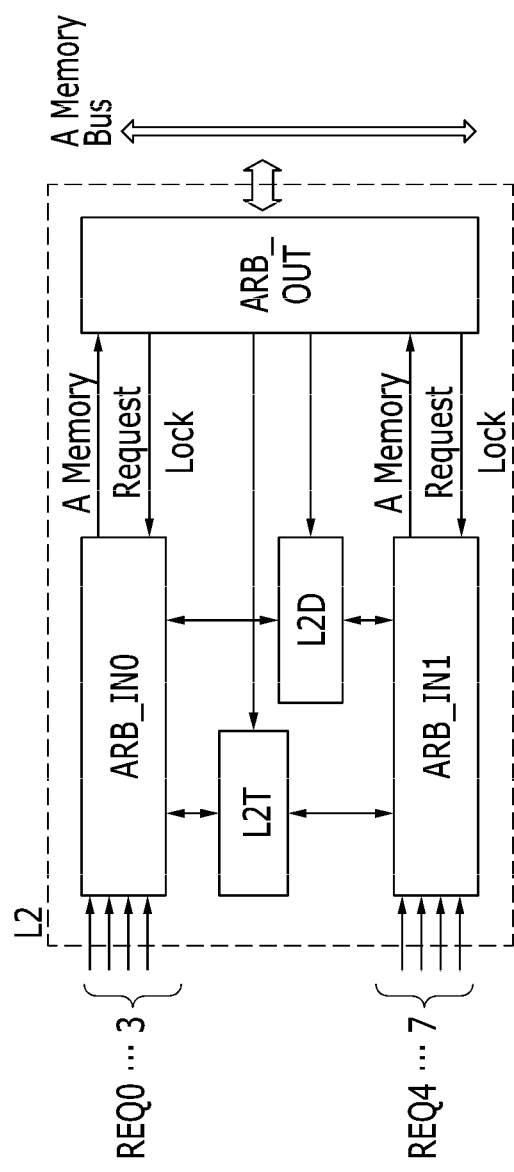
FIG. 8 is a schematic diagram illustrating an L2 cache having a multi-layered structure according to an exemplary embodiment of the present invention.

FIG. 7 is a schematic diagram illustrating an L1 cache having a multi-layered structure according to an exemplary embodiment of the present invention, and FIG. 8 is a schematic diagram illustrating an L2 cache having a multi-layered structure according to an exemplary embodiment of the present invention.

First, as shown in FIG. 7 (a), one interpolation unit includes two sub-units L1E and L1O with respect to even- and odd-numbered lines, respectively.
DeletedTexts Further, respective sub-units include two L1 caches L1L and L1R to provided left and right pixels.

A pixel generation unit 4PTS generates four neighboring coordinates with respect to the sub-pixel coordinate x'. In addition, the four generated coordinates are sent to a total of four L1 caches in parallel. A final interpolation unit INTERP receives four pixel values from 4 L1 caches to interpolate a pixel value in the sub-pixel coordinate x'.

In general, since the L1 cache has a small size corresponding to 16, 32, or 64 words, the L1 cache is implemented by a flip-flop. FIG. 8 (b) illustrates a configuration example of the L1 cache storing only 16 words.

As shown in FIG. 7 (b), only a horizontal image coordinate x is directly mapped to the cache. A cache index field cid is used to search a cache block, and a tag field (tag) and a vertical position field Y are used to detect hit/miss. When the hit occurs, values of a tag field and a vertical position field in which the hit occurs are directly provided.

The exemplary embodiment of the present invention may use a resource share structure using a flip-flop for processing a multiple pipeline to reduce a resource while increasing a hit rate of the cache block. Two L1 caches L1L and L1R are close to each other as shown in FIG. 7 (a).

It is assumed that a right pixel $x_1$ is missed at an L1R of a L1E. It is assumed that a corresponding pixel requests data from the L2E, and the L1R stores data fetched from the L2E. If the sub-pixel coordinate is moved rightward at a next clock period, a left pixel $x_0$ of a corresponding sub-pixel is hit with high probability in the right cache L1R. However, if the corresponding sub-pixel is moved leftward, the situation may be converse thereto. This means that the right pixel is hit at a left cache L1 with high probability at a next clock.

When a minimum of 8 requests are achieved in parallel to one L2 cache from 8 interpolation units, an intermediate unit ARB intermediates requests between two L1 caches and one L2 cache. Since left and right pixels of one sub-pixel coordinate are horizontally close to each other, they are present at the same word with a high probability in the L2 cache. Accordingly, in order to reduce pipeline delay, the intermediate unit processes a request for the same word in parallel.

Meanwhile, the L2 cache shown in FIG. 8 is also implemented as the rolling cache. In order to improve efficiency of a single port SRAM or memory, the L2 cache is implemented as a dual port SRAM as an example.

Further, as shown in FIG. 8, the L2 cache includes two input intermediation units ARB_IN0 ARB_IN1 and an output intermediate unit ARB_OUT. In the exemplary embodiment of the present invention, a function of processing an input request is distinguished from a function of processing a memory request, but the embodiment of the present invention is not limited thereto.

The two input intermediate units may access a tag memory L2T and a data memory L2D, respectively, to simultaneously process different requests. When the request is missed, the two input intermediate units wait until new data of a non-overlapped area are provided to the cache block from the memory.

However, since only one cache block is missed, the two input intermediate units do not need to wait for another request for another block. Accordingly, when data are transmitted from the memory, the output intermediate unit ARB_OUT sends a lock signal to the two input intermediate units, and updates a cache memory.

When the lock signal is provided to the two input intermediate units, the two input intermediate units disregard only requests for a missed block but continuously accept requests for other blocks. In addition, when several requests access the same word, corresponding data may simultaneously respond to the requests. Since the input and output intermediate units process only requests thereof, the input and output intermediate units may be designed similar to configurations of general intermediated units.

In this case, when all input requests are missed, the input intermediate units stop so that reusability of data by the cache may be increased and collision miss may be reduced. That is, it is assumed that processing all misses is terminated, and continuous input requests are achieved at a location beyond a vertical range of a corresponding cache block.

Accordingly, when the request is missed at a top end of the corresponding cache block, the input intermediate unit reads data of the top end, and the cache block ascends upward. If another request is missed at a bottom end of the cache, the input intermediate unit again reads the data of the bottom end from the memory, and the cache block again descends downward.

In this way, the cache block is repeatedly moved upward or downward to rapidly increase the missed penalty. This refers to a collision miss. However, while the data of the top end are read from the memory, if the input intermediate unit processes other input requests of a bottom end, since a corresponding cache block does not need to descend downward, the collision miss is reduced.

Figure 9:
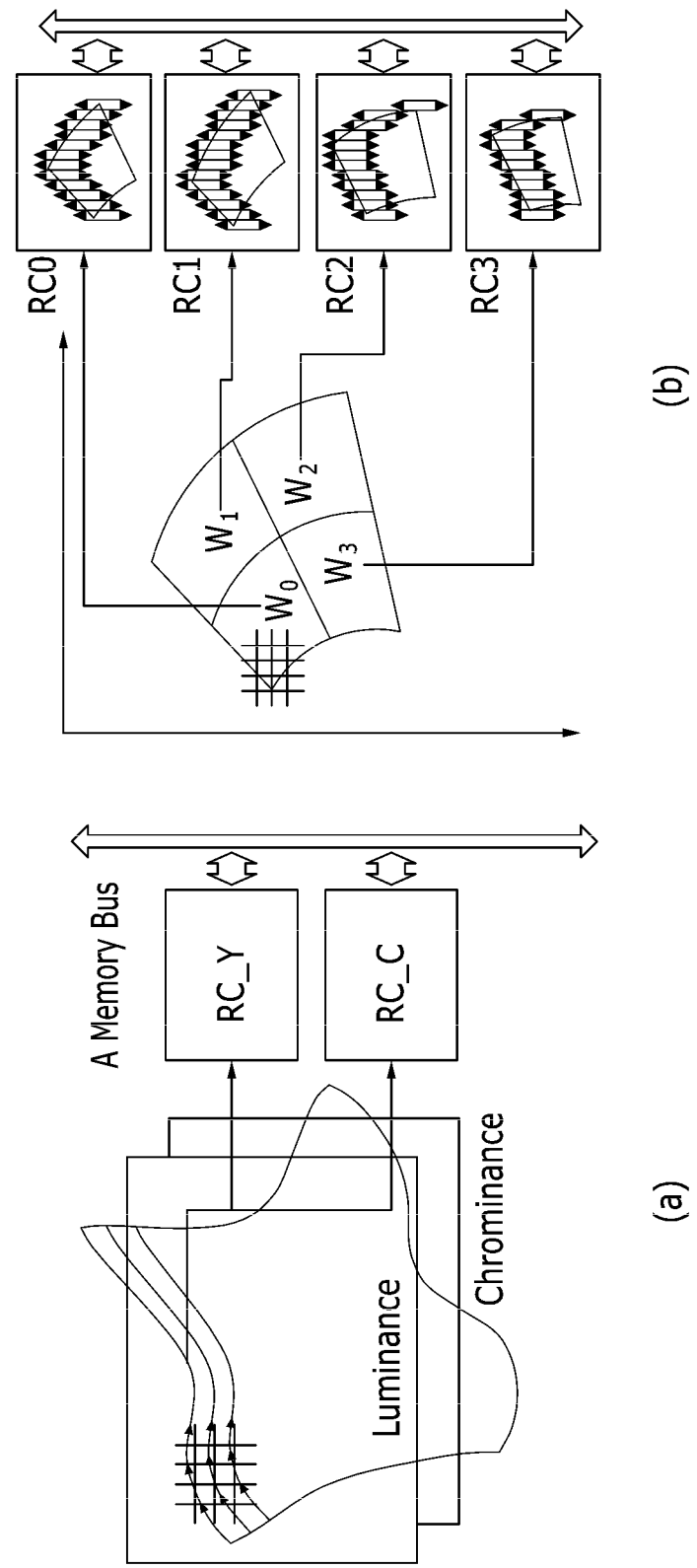
FIG. 9 is a schematic diagram illustrating a multiple cache according to an exemplary embodiment of the present invention.

FIG. 9 is a schematic diagram illustrating a multiple cache according to an exemplary embodiment of the present invention.

A multiple cache structure may perform high performance processing based on an algorithm and an available hardware resource. If the available resource is included in hardware, the multiple cache structure may be used. This means that a parallel interpolation and cache may be used for each processor.

The number of available processors may be selected by determining parallel availability of the algorithm. That is, as show in FIG. 9 (a), an image system may use caches by brightness and colors in order to process an image of a YCbCr 4:2:2 format which is a type of a color space.

Further, as shown in FIG. 9 (b), for window based vision algorithms, a separate cache is applicable to sub-windows obtained by dividing local windows. If a separate cache form is applied to sub-windows by color elements, performance improvement of a maximum of 8 times may be expected.

As mentioned previously, the performance of the rolling cache when the rolling cache is applied to image processing will be described with reference to FIGS. 10A to FIG. 10D. Since the performance of the rolling cache is significantly changed according to an algorithm, a cache design parameter, and a design of the memory controller, the exemplary embodiment of the present invention determines the performance based on a reduced degree of the miss penalty as an example.

The miss penalty greatly depends on the performance of the memory controller. The rolling cache accesses the memory in a block form. Accordingly, in order to transmit block data of N words and M lines, an external SDR/DDR needs the following several elements. As one of the several elements, the cache needs several clock periods to transmit a block address to the memory controller. Further, a predetermined clock cycle is required to set a bank, a row address, and a column address of the memory, and 2 clock cycles or 3 clock cycles are added to start transmission of first data. Further, N clock cycles are required by lines.

Assuming that 2 clock cycles are required to send the address, a K clock cycle is required to set an address of each line, and 3 clock cycles are required to send first data, "$2+(K+3+N) \times M$" clock cycles are required for the miss penalty. Further, in a case where 8 words and 32 rows are configured by 32 bytes and K=7, the number of words per clock cycle is "$NM/(2+(K+3+N) \times M)=256/578=0.44$ words/clock cycle".

However, if the memory controller is efficiently designed, the memory controller may perform continuous address preset commands except for a first address preset command while transmitting data. Further, a prepared time of first data of each line may be removed.

Accordingly, the number of words transmitted per clock cycle is "$NM/(2+K+3+NM)=256/268=0.96$ words/clock", and a data output amount may be increased about $0.96/0.44=2.18$ times. Such a situation occurs in the first case of the Table 1.

In order to provide a proper performance indicator, a miss rate and a miss penalty should be considered. This is because the processor should wait while reading data from the memory. In order evaluate the performance of the L2 cache, an average memory access time (AMAT) may be used as a performance indicator. The AMAT is calculated based on a time required upon hit, a miss rate, and a miss penalty, which are expressed by the following Equation 1.

$$AMAT_{L2} = \text{hit time}_{L2} + \text{miss rate}_{L2} \times \text{miss penalty}_{L2} \quad \text{[Equation 1]}$$

In the L2 cache, the hit time (hit time$_{L2}$) is 2 clock cycles. When the miss occurs, the L2 cache requests block data with the size of 8 words in one line. Assuming that the memory controller sets each line address for M=1 and K=7 clock cycles, the miss penalty becomes "$2+K+3+NM=12+8=20$ clock cycles". Assuming that a miss rate of the L2 cache is 10%, the AMAT becomes "$2+0.1 \times 20=4$ clock cycles".

An AMAT of a 2 level cache may be defined by the following Equation 2.

$$AMAT_{L1} = \text{hit time}_{L1} + \text{miss rate}_{L1} \times AMAT_{L2} \quad \text{[Equation 2]}$$

The hit time in the L1 cache is 1 clock cycle. If the miss rate in the L1 cache per input request is 25%, the AMAT=1+ $0.25 \times 4=2$ clock cycles. Accordingly, a delay time may be reduced by half using a multi-layered cache.

If a full-HD image of $1920 \times 1080$ is processed with 30 fps, the entire required time is "$1920 \times 1080 \times 30 \times AMAT$". When only the L2 cache is used, the entire required time is 248.8 Mclks. When the 2 level cache is used, the entire required time is 124.4 Mclks. The memory output amount is $1920 \times 1080 \times 30 \times \text{miss rate}_{L2} \times \text{miss penalty}_{L2} = 124.4$ MB/s. This is because the memory output amount depends only on the miss rate of the L2 cache. If the rolling cache and the memory are operated at 150 MHz, requirements are satisfied.

The efficiency of the rolling cache may be verified through image conversion. This is because the image conversion may significantly change a pixel access pattern.

$$C\begin{pmatrix} x' \\ 1 \end{pmatrix} = \begin{bmatrix} \alpha R(\theta) & t \\ v^T & 1 \end{bmatrix} C \begin{pmatrix} x \\ 1 \end{pmatrix} \quad \text{[Equation 3]}$$

In Equation 3, the x' represents the converted image coordinate, the x represents a reference coordinate, and the $$C = \begin{bmatrix} I & -c \\ 0^T & 1 \end{bmatrix}$$

represents a matrix as an image center c. For comparison, an experimental image is rotated every 30° interval using $\alpha=1.5$, $t=0$, and $v=0$.

The exemplary embodiment of the present invention has a 32 bit SDRAM and uses even and odd caches, and converts the image in a window unit of a block form having a 16×16 size. According to the image size, a 16 KB×2 cache is used with respect to an image having a 1024×1024 size, and a 32 KB×2 cache is used with respect to an image having a 2048×2048 size as an example. Further, a miss rate, a miss penalty, and an AMAT with respect to different image sizes in the rolling cache RC are compared with those of a simple direct-mapped (DM) cache, and 2-way set associative (2W), 4-way set associative (4W), 8-way set associative (8W), and 16-way set associative (16W) caches.

In this case, it is assumed that there is no L1 cache and there is no pipeline calculation, and all caches have the same hit time. This is because performances of different cache structures may be easily evaluated and compared with each other, and it may review how fast the rolling cache is or whether the rolling cache is simple before implementation.

Table 2 and Table 3 illustrate test parameters by caches, an average result of 12 experimental angles, and rolling cache and performance comparison results with respect to different image sizes.

TABLE 2

| Parameters (per cache) | DM | 2W | 4W | 8W | 16W | RC |
|---|---|---|---|---|---|---|
| No. of Ways | 1 | 2 | 4 | 8 | 16 | 1 |
| No. of Entries | 32 | 32 | 32 | 32 | 32 | 32 |
| Data Size/Entry (Bytes) | 512 | 256 | 128 | 64 | 32 | 16 × 32 |
| Tag Size/Entry (bits) | 6 | 29 | 30 | 31 | 32 | 10 |
| Total Tag Size (bits) | 192 | 1856 | 3840 | 7636 | 16384 | 320 |
| Result (Average) | | | | | | |
| Hit Time (clks) | 2 | 2 | 2 | 2 | 2 | 2 |
| Miss Rate (%) | 0.883 | 0.993 | 1.207 | 1.635 | 1.761 | 1.709 |
| Miss Penalty (clks/miss) | 139 | 75 | 43 | 27 | 19 | 19.245 |
| AMAT (clks/pixel) | 3.232 | 2.745 | 2.52 | 2.442 | 2.335 | 2.329 |
| Total Cycle (Mclks) | 6.013 | 5.107 | 4.688 | 4.543 | 4.343 | 4.333 |
| Mem. Bandwidth (Mwords) | 2.292 | 1.386 | 0.968 | 0.822 | 0.622 | 0.612 |
| Mem. BW (Mw/s @ 30 fps) | 68.76 | 41.58 | 29.04 | 24.66 | 18.66 | 18.36 |
| Performance Comparison with respect to RC | | | | | | |
| AMAT | 1.388 | 1.179 | 1.082 | 1.049 | 1.003 | |
| Total Cycle | 1.388 | 1.179 | 1.082 | 1.048 | 1.002 | |
| Mem. Bandwidth | 3.745 | 2.265 | 1.582 | 1.343 | 1.016 | |

TABLE 3

| Parameters (per cache) | DM | 2W | 4W | 8W | 16W | RC |
|---|---|---|---|---|---|---|
| No. of Ways | 1 | 2 | 4 | 8 | 16 | 1 |
| No. of Entries | 64 | 64 | 64 | 64 | 64 | 64 |
| Data Size/Entry (Bytes) | 512 | 256 | 128 | 64 | 32 | 16 × 32 |
| Tag Size/Entry (bits) | 7 | 32 | 33 | 34 | 35 | 11 |
| Total Tag Size (bits) | 448 | 4096 | 8448 | 17408 | 35840 | 704 |
| Result (Average) | | | | | | |
| Hit Time (clks) | 2 | 2 | 2 | 2 | 2 | 2 |
| Miss Rate (%) | 0.89 | 0.998 | 1.216 | 1.652 | 1.759 | 1.73 |
| Miss Penalty (clks/miss) | 139 | 75 | 43 | 27 | 19 | 19.12 |
| AMAT (clks/pixel) | 3.236 | 2.748 | 2.523 | 2.446 | 2.334 | 2.331 |
| Total Cycle (Mclks) | 24.104 | 20.474 | 18.794 | 18.222 | 17.39 | 17.369 |
| Mem. Bandwidth (Mwords) | 9.204 | 5.574 | 3.894 | 3.323 | 2.49 | 2.469 |
| Mem. BW (Mw/s @ 30 fps) | 276.12 | 167.22 | 116.82 | 99.69 | 74.7 | 74.07 |
| Performance Comparison with respect to RC | | | | | | |
| AMAT | 1.388 | 1.179 | 1.082 | 1.049 | 1.001 | |
| Total Cycle | 1.388 | 1.179 | 1.082 | 1.049 | 1.001 | |
| Mem. Bandwidth | 3.728 | 2.258 | 1.577 | 1.346 | 1.009 | |

As the number of ways is increased, miss rates in set associative caches are increased. However, as the cache block size is reduced, the miss penalty, the AMAT, the total calculation clock number, and a memory bandwidth are reduced.

The miss penalty is calculated based on the number of L2 misses and a total clock cycle upon memory access. For example, when a 2048×2048 image is rotated by 60°, as illustrated in Table 3, 129,153 misses and 2,469,260 memory access clock cycles are required, and the miss penalty is 2,469,260/129,153=19.1189 clock cycles. This is substantially the same as a calculation result given from a sub-section V-A.

The AMAT is calculated based on the calculated pixel number and the total calculation time. As described above, 7,449,264 pixels are calculated and the 17,367,959 calculation time is required. The calculated pixels have a very much smaller value than 2048×2048×4. This is because a plurality of coordinate converted pixels exist outside the image.

The AMAT listed in Table 3 is 17,367,959/7,449,264=2.3315 clock cycles. When the AMAT is used in Equation 1, the AMAT is almost the same as 2+1.73× 19=2.3287. Accordingly, the rolling cache has the lowest AMAT of AMATs of the caches used upon simulation. The direct mapping cache needs a memory bandwidth of 2.3 to 3.7 times greater than the rolling cache, and data of about 167.22 Mw/s are required to process images with 30 fps, but the rolling cache or a 16W cache needs data of about 74.67 Mw/s.

If the way number of set associative caches is increased, caches need more resources. For example, when processing an image having a 2048×2048 size, the direct mapping cache needs a tag memory of 448 bits, and the 16W cache needs a tag memory of 35,840 bits. However, the rolling cache needs a tag memory of 704 bits.

FIG. 10A to FIG. 10D illustrate performance of a rolling cache according to when an exemplary embodiment of the present invention is applied.

Figure 10A:
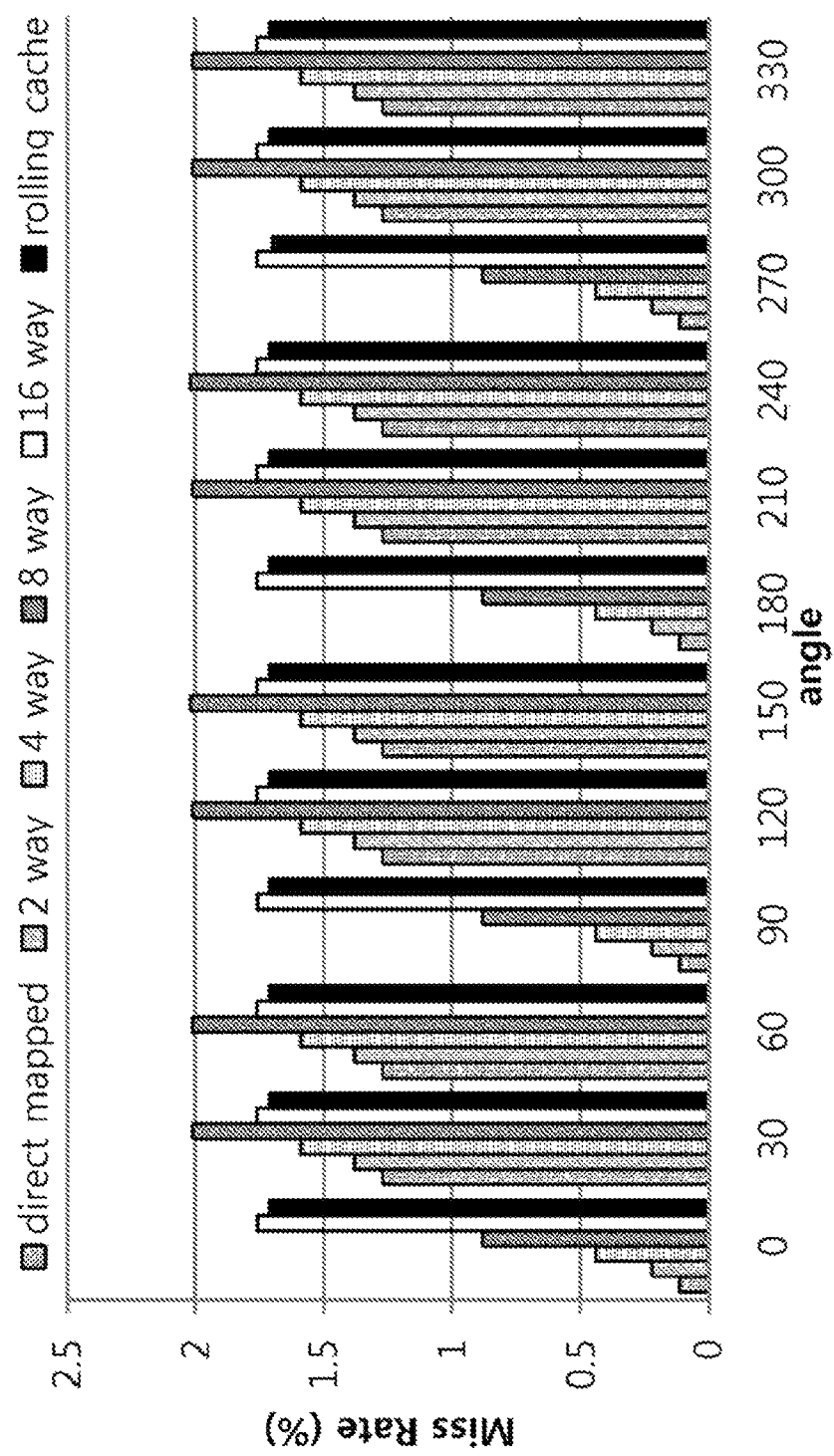
FIG. 10A to FIG. 10D illustrate performance of a rolling cache according to an exemplary embodiment of the present invention is applied.
Figure 10B:
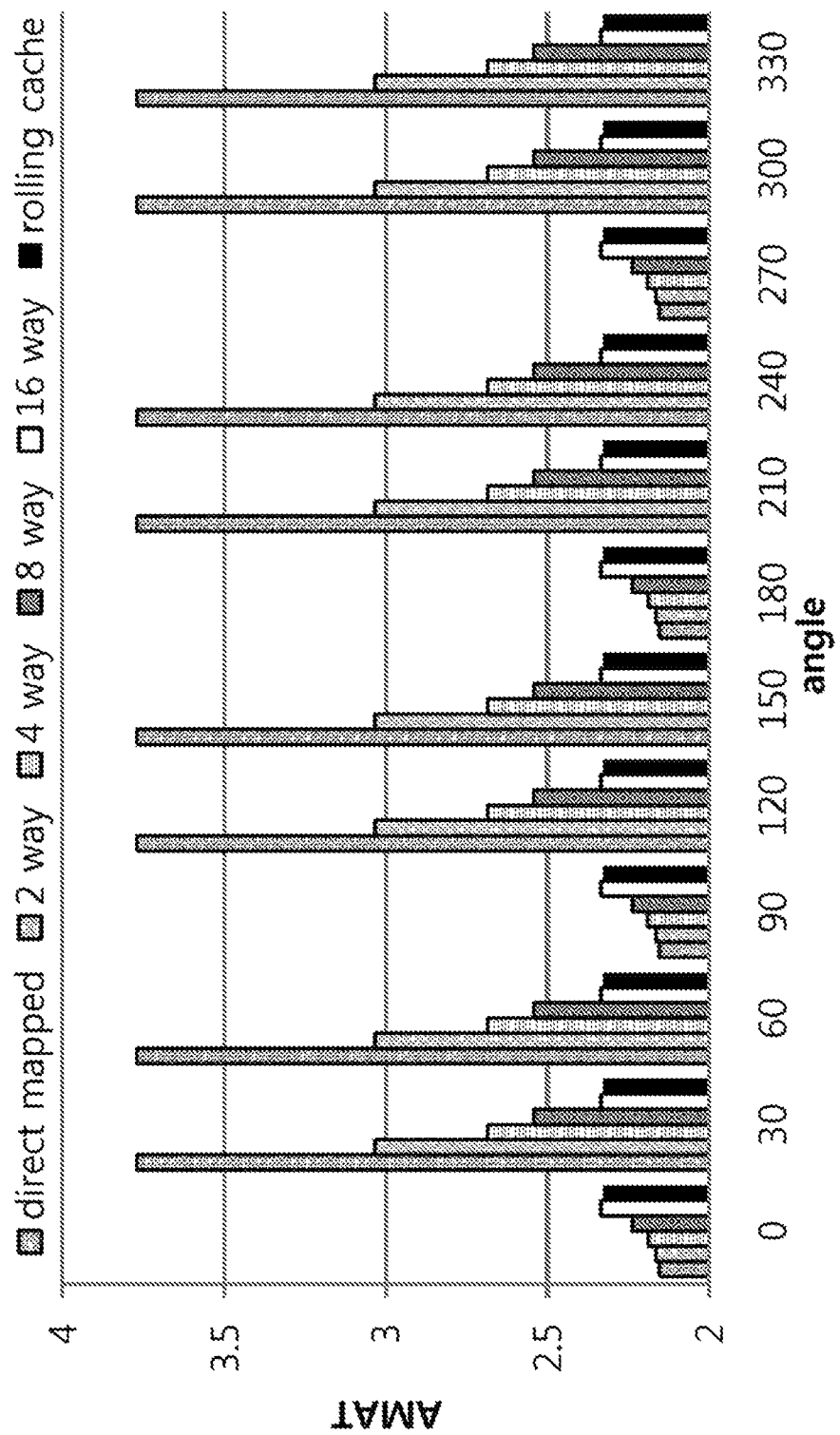
Figure 10C:
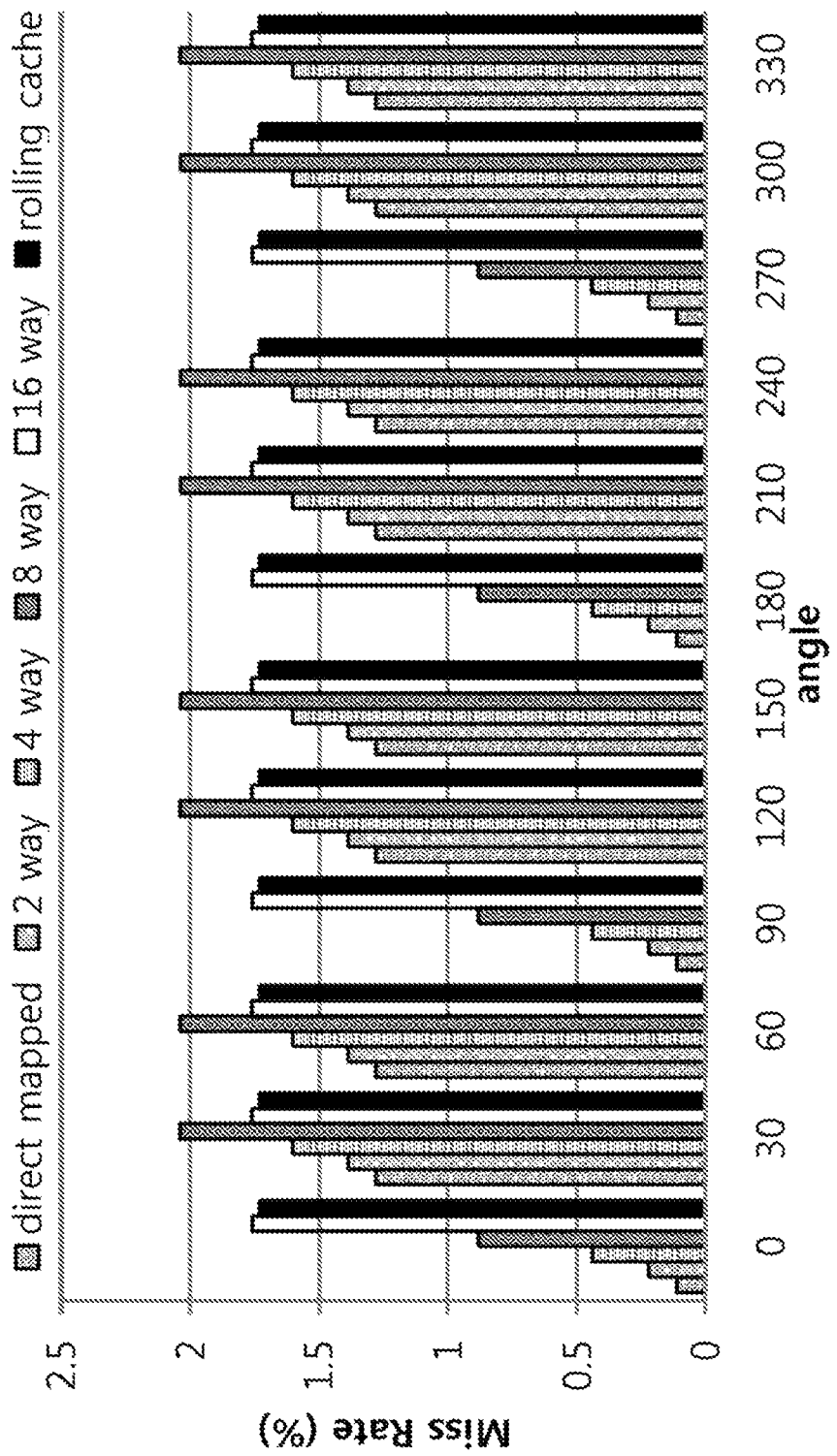
Figure 10D:
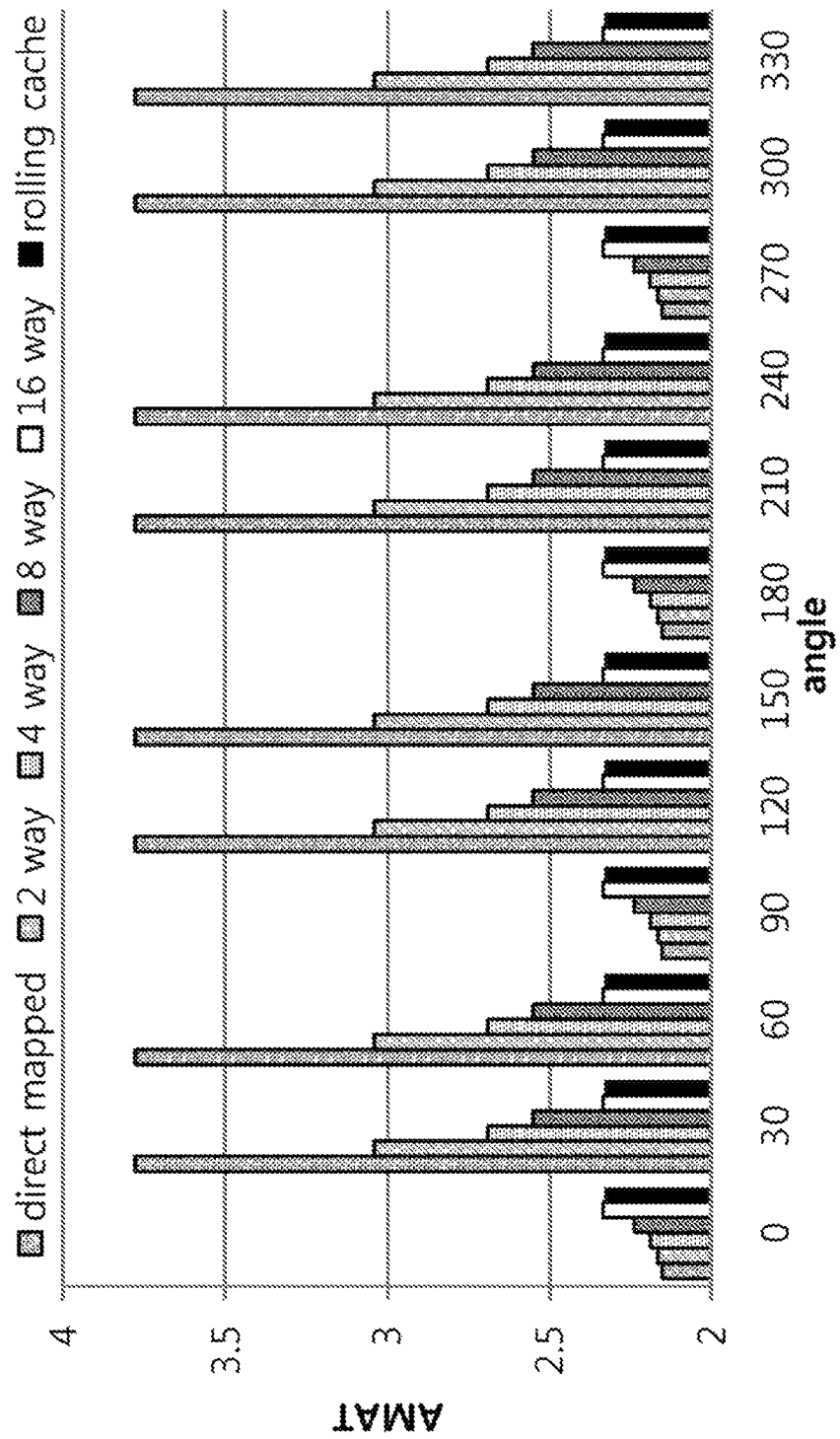

FIG. 10A to FIG. 10D illustrate comparison results of a miss rate and an AMAT with respect to rotations at a plurality of angles of various image sizes. That is, FIG. 10A and FIG. 10B illustrate comparison results of the miss rate and the AMAT with respect to a 1024×1024 image when two 16 KB caches are used, and FIG. 10C and FIG. 10D illustrate comparison results of the miss rate and the AMAT with respect to a 2048×2048 image when two 16 KB caches are used.

Upon rotation of 0, 90, 180, and 270°, a reason why the direct mapping cache represents the best result is that the converted pixel coordinates are accessed in a raster scan order. However, in most angles, as shown in FIG. 10A to FIG. 10D, it will be understood that the rolling cache represents the lowest performance in the AMAT.

Particularly, when comparing the rolling cache with the direct mapping cache in FIG. 10D, 28%/39% is reduced in an AMAT of the rolling cache, and 74%/82% is reduced in a required memory bandwidth.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A cache system comprising:
an information storage unit to extract pixel information and address information of a corresponding pixel from an input image and to store the extracted pixel information and the extracted address information; and
a processor to process the image by applying a vertical rolling mechanism or a horizontal rolling mechanism using the extracted and stored information from the information storage unit,
wherein the address information is divided into a cache index used to select a cache block, tag information included in a horizontal coordinate and compared with a tag field of the cache block to detect whether data are hit or missed, a line index included in a vertical coordinate mapped directly to select a line in the cache block, and a word index included in a horizontal coordinate mapped directly to select a word of the line in the cache block and used when dividing a width and an image of the cache block into columns.

2. The cache system of claim 1, wherein
the processor
determines whether a missed cache block is replaced and performs vertical rolling or horizontal rolling when the missed cache block is replaced, to replace and update only the missed cache block and to reuse non-missed data.

3. The cache system of claim 2, wherein the processor stores a vertical range of the cache block as a pair of vertical start position information and vertical end position information, or only the vertical start position information in order to perform the vertical rolling to vertically move a column of the missed cache block.

4. The cache system of claim 3, wherein the missed cache block is replaced and updated when the cache block is completely empty, when a pixel vertical coordinate is located higher than a vertical start position of the cache block, or when the pixel vertical coordinate is located lower than a vertical end position of the cache block.

5. The cache system of claim 2, wherein the processor performs the horizontal rolling to move a column of the missed cache block rightward and leftward, and tag information of the horizontal coordinate represents an effect equal to an effect of a vertical rolling without adding a resource.

6. The cache system of claim 2, wherein the processor performs the vertical rolling or the horizontal rolling to reduce a missed penalty when processing the image.

* * * * *